(12) United States Patent
Persiani et al.

(10) Patent No.: US 8,398,127 B2
(45) Date of Patent: Mar. 19, 2013

(54) OPENING AND CLOSING DEVICE FOR LIDS

(75) Inventors: Luigi Persiani, Osimo (IT); Giuseppe Rossetti, Osimo (IT)

(73) Assignee: SO.GE.MI.-S.p.A., Dronero CN (IT)

( * ) Notice: Subject to any disclaimer, the term of this patent is extended or adjusted under 35 U.S.C. 154(b) by 445 days.

(21) Appl. No.: 12/312,478

(22) PCT Filed: Sep. 27, 2007

(86) PCT No.: PCT/IT2007/000673
§ 371 (c)(1),
(2), (4) Date: May 12, 2009

(87) PCT Pub. No.: WO2008/059543
PCT Pub. Date: May 22, 2008

(65) Prior Publication Data
US 2010/0045049 A1    Feb. 25, 2010

(30) Foreign Application Priority Data

Nov. 13, 2006 (IT) .............................. MC2006A0150

(51) Int. Cl.
*E05C 1/02* (2006.01)
*E05C 1/06* (2006.01)
*E05C 1/08* (2006.01)
*E05C 1/12* (2006.01)

(52) U.S. Cl. ........ 292/163; 292/137; 292/138; 292/169; 292/175

(58) Field of Classification Search ............... 292/14, 292/137, 138, 144, 145, 163, 169, 174, 175, 292/DIG. 4, DIG. 11
See application file for complete search history.

(56) References Cited

U.S. PATENT DOCUMENTS

| 4,141,520 | A  | * | 2/1979  | Beijer et al. ................. 244/224 |
| 4,270,781 | A  | * | 6/1981  | Nishimura ................. 292/251.5 |
| 4,792,165 | A  | * | 12/1988 | Nishimura ..................... 292/19 |
| 4,813,723 | A  | * | 3/1989  | Anderson et al. ......... 292/336.3 |
| 4,943,124 | A  | * | 7/1990  | Dietz et al. .................... 312/222 |
| 6,193,301 | B1 | * | 2/2001  | Baumeier et al. ............ 296/121 |
| 6,318,771 | B1 | * | 11/2001 | Holloway et al. ........ 292/341.16 |
| 6,336,245 | B1 | * | 1/2002  | Sakakibara ...................... 16/82 |
| 6,572,160 | B2 | * | 6/2003  | Bunting ........................ 292/342 |
| 6,702,357 | B2 | * | 3/2004  | Joerg et al. ................. 296/97.22 |
| 6,705,140 | B1 | * | 3/2004  | Dimig et al. .................... 70/277 |
| 6,739,633 | B2 | * | 5/2004  | Holloway et al. ............ 292/199 |
| 6,808,214 | B2 | * | 10/2004 | Sato et al. ................ 292/341.15 |
| 7,010,948 | B1 | * | 3/2006  | Hsieh .............................. 70/257 |
| 7,152,892 | B2 | * | 12/2006 | Rechberg ..................... 292/304 |
| 7,377,559 | B2 | * | 5/2008  | Gramss et al. ................ 292/163 |
| 2004/0075281 | A1 | * | 4/2004 | Ueki .............................. 292/65 |

* cited by examiner

*Primary Examiner* — Thomas Beach
*Assistant Examiner* — Nathan Cumar
(74) *Attorney, Agent, or Firm* — Lowe, Hauptman, Ham & Berner, LLP

(57) ABSTRACT

The present invention relates to an opening and closing device of push-push type for lids, with particular reference to the lids of fuel tanks in cars and motorcycles, which uses a mechanism comprising a heart-shaped cam (6) and a roto-translating pin (3), in which the cam (6) is positioned in detached and parallel position with respect to the roto-translating pin (3) and in which the heart-shaped cam (6) and the pin (3) are connected by means of a rocker (8).

11 Claims, 5 Drawing Sheets

OPENING AND CLOSING DEVICE FOR LIDS

FIELD OF THE INVENTION

The present patent application relates to an opening and closing device for lids, with particular reference to the lids of fuel tanks in cars and motorcycles.

The device of the invention belongs to the group of so-called "push-push" locks, in which the opening and closing of the lid are simply obtained by pushing the lid itself.

In other words, the lid is automatically released from the hook that engages it with the lock when the user presses the closed lid, and it is automatically released from the lock when the user closes the open lid and pushes it against the lock.

BACKGROUND OF THE INVENTION

In order to understand the inconveniences that are meant to be remedied by the present invention, this description continues by illustrating the structural and functional configuration of this type of known locks.

This type of "push-push" locks are provided with a roto-translating pin that acts as engagement means for the lid, having a basically rectangular head that is inserted and engaged in a box-shaped housing on the internal side of the lid, characterised by the fact that it is provided with a rectangular slot that gives access to the internal compartment of the said housing with higher width compared to the rectangular slot.

The said roto-translating pin is inserted inside a housing and guiding chamber, in which it is free to slide axially and rotate, being constantly subject to the force of an ejection spring compressed during the closing of the lid.

The said roto-translating pin is matched with the housing and guiding chamber in such a way that a 90° rotation of the pin is determined around its longitudinal axis during each forward or backward travel, and is repeated in inverse direction during the next ejection or forward travel.

Evidently, at the end of the ejection travel of the pin, the rectangular head must have a position aligned with the slot through which the engagement head enters and exits the engagement housing, while at the end of the forward travel of the pin, the rectangular head must have an orthogonal position with respect to the slot in order to remain engaged inside the slot.

Finally, it must be said that a special cam—known as heart-shaped cam—is provided on one side of the roto-translating pin, at the opposite end with respect to the engagement head, which is in turn engaged with a flexible tappet.

Cams of this type are commonly used in the so-called click pens, in which every pressure of the pen button alternatively causes the stable release or the stable retraction of the pen tip.

The said heart-shaped cam comprises two parallel tracks joined at the ends to form a closed circuit, in which the said tappet slides cyclically in one direction only.

It must be noted that the bottom surface of one of the said tracks has a series of ascending inclined planes, while the other track has a series of descending slides and steps, so that the tappet that slides inside the circuit moves forward in a forced direction along the descending slides and steps and then inverts the travel direction along the ascending inclined planes.

The heart-shaped cam definition derives from the fact that the shape of the closed circuit formed by the said pair of parallel tracks suggests the shape of a heart, being characterised by a lower point and a V-shaped central upper cavity.

More precisely, the said tappet is alternatively engaged and released from the said V-shaped cavity at every small travel of the heart-shaped cam, which obviously follows the alternated travels of the said roto-translating pin.

When the lid is closed, the tappet is firmly engaged with the heart-shaped cam, so that also the pin is held in backward position, in spite of the force of the ejection spring.

If the user presses the lid, the roto-translating pin moves back shortly inside the housing and guiding chamber, together with the heart-shaped cam, with consequent release of the tappet, in such a way that the roto-translating pin moves forward under the force of the ejection spring.

As mentioned earlier, at the end of the ejection travel of the roto-translating pin, the engagement head is not engaged to the lid, thus allowing the user to open it.

When the lid is closed and pushed against the engagement head, the roto-translating pin is pushed inside the housing and guiding chamber again, in such a way that at the end of the backward travel the tappet is re-engaged automatically and firmly inside the cavity of the heart-shaped cam.

As mentioned earlier, at the end of the backward travel of the roto-translating pin, the engagement head is engaged inside the engagement housing on the internal side of the lid, thus preventing the user from opening it.

The first inconvenience of this type of push-push locks is represented by the excessive overall dimensions in parallel direction to the longitudinal axis of the said roto-translating pin.

The said inconvenience is caused by the fact that the heart-shaped cam is located in the back in alignment with the roto-translating pin, whose length is therefore added to the length of the heart-shaped cam and relevant flexible tappet.

This dimension affects the selection of the inclination angle of the helicoidal thread that determines the roto-translation of the roto-translating pin.

As a matter of fact, threads with high inclination angles should be used in order to reduce the force necessary to push the roto-translating pin inside the housing and guiding chamber.

The higher the inclination angle, the longer the travel of the roto-translating pin will be, in order to allow 90° rotation of the engagement head.

This means that small inclination angles must be used to reduce the dimensions of the current locks, with the inconvenience that the user must push the lid hard.

Another inconvenience consists in the fact that the roto-translating pin is subject to an unbalanced force system that favours the creation of considerable friction able to prevent the free roto-translation of the pin.

This second inconvenience is due to the fact that the said heart-shaped cam is fixed to one side of the roto-translating pin, on which the flexible tappet, which slides against and along the tracks of the heart cam, discharges its unbalanced force.

Another inconvenience of this type of known push-push locks consists in the difficult assembly due to the mutual position of the roto-translating pin and the heart-shaped cam with the relevant flexible tappet.

SUMMARY OF THE INVENTION

The purpose of the present invention is to remedy all the aforementioned inconveniences and limits.

All these purposes have been achieved by the present invention, whose main characteristics are illustrated in detail in the first claim.

The present invention is founded on the idea that the heart-shaped cam is positioned in detached parallel position with respect to the roto-translating pin, and is connected to it by means of a flexible rocker that ends on one side with the tappet interfaced with the heart-shaped cam and on the other side with a semi-arch fork engaged with the roto-translating pin.

BRIEF DESCRIPTION OF THE DRAWINGS

For purposes of clarity, the description of the device of the invention continues with reference to the enclosed drawings, which are intended for purposes of illustration only and not in a limiting sense, whereby.

DETAILED DESCRIPTION OF THE INVENTION

With reference to the aforementioned figures, the device of the invention is of the type comprising a case (1) closed by a lid (2) that houses the push-push lock mechanism. The said mechanism comprises a roto-translating pin (3) that comes out shortly from the case (1) and ends with an enlarged head (4) that remains outside the case (1) also when the pin (3) moves backwards inside the case (1) during its alternated travels.

Figure 1:
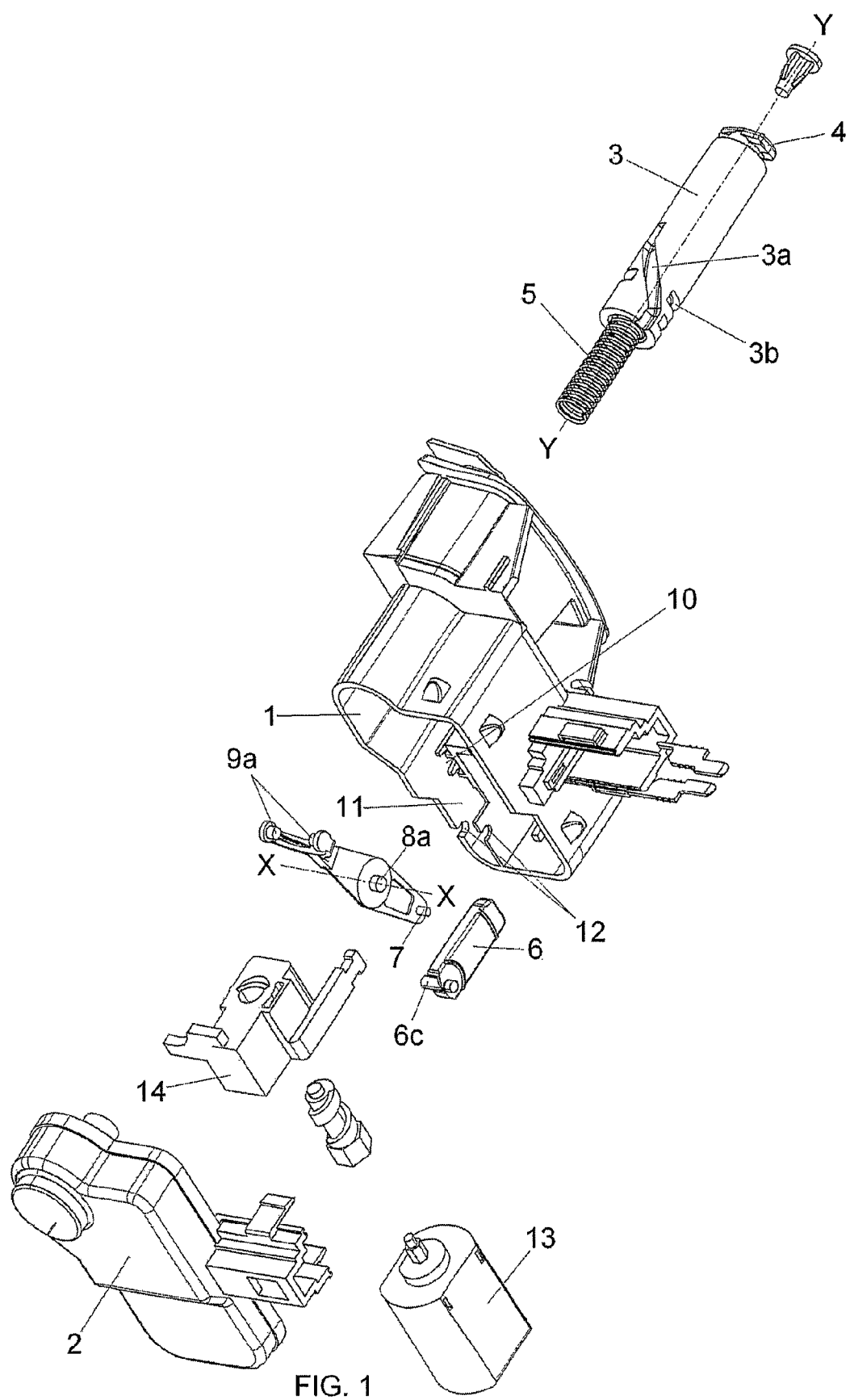
FIG. 1 is an exploded axonometric view of the device of the invention from a first angle.
Figure 2:
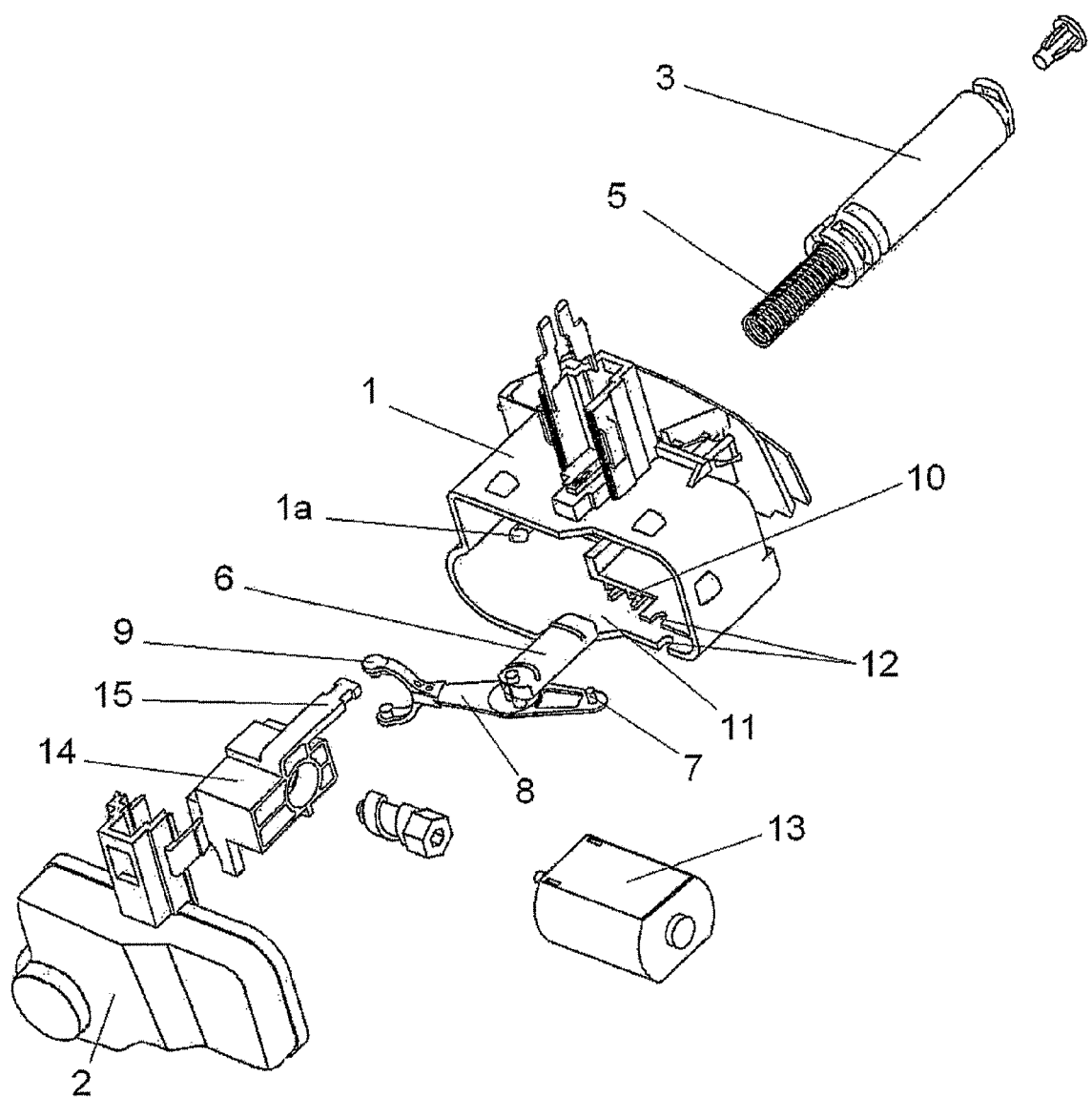
FIG. 2 is an exploded axonometric view of the device of the invention from a second angle.
Figure 3:
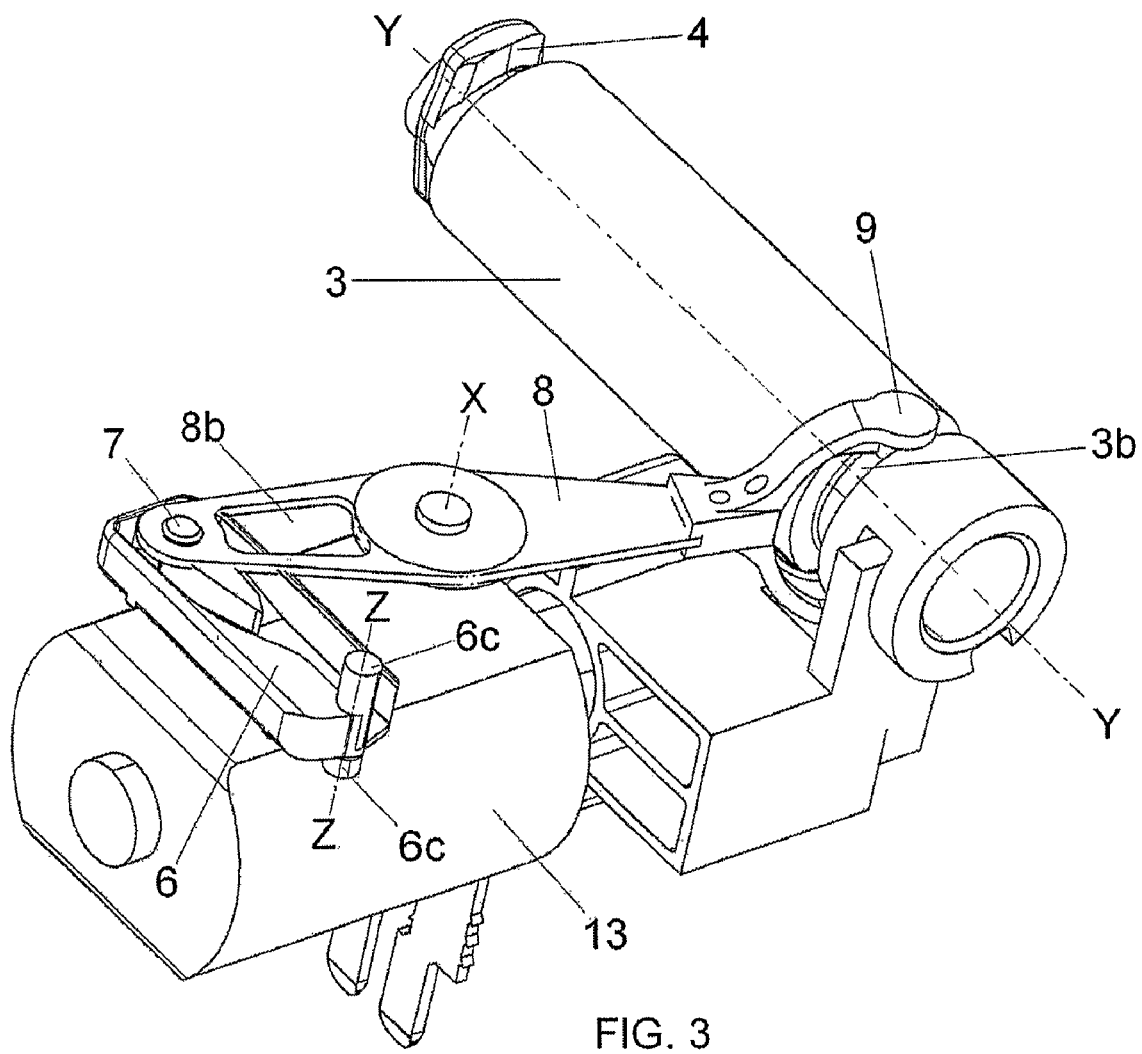
FIG. 3 is an axonometric view that shows the rocker that connects the heart-shaped cam and the roto-translating pin.
Figure 4:
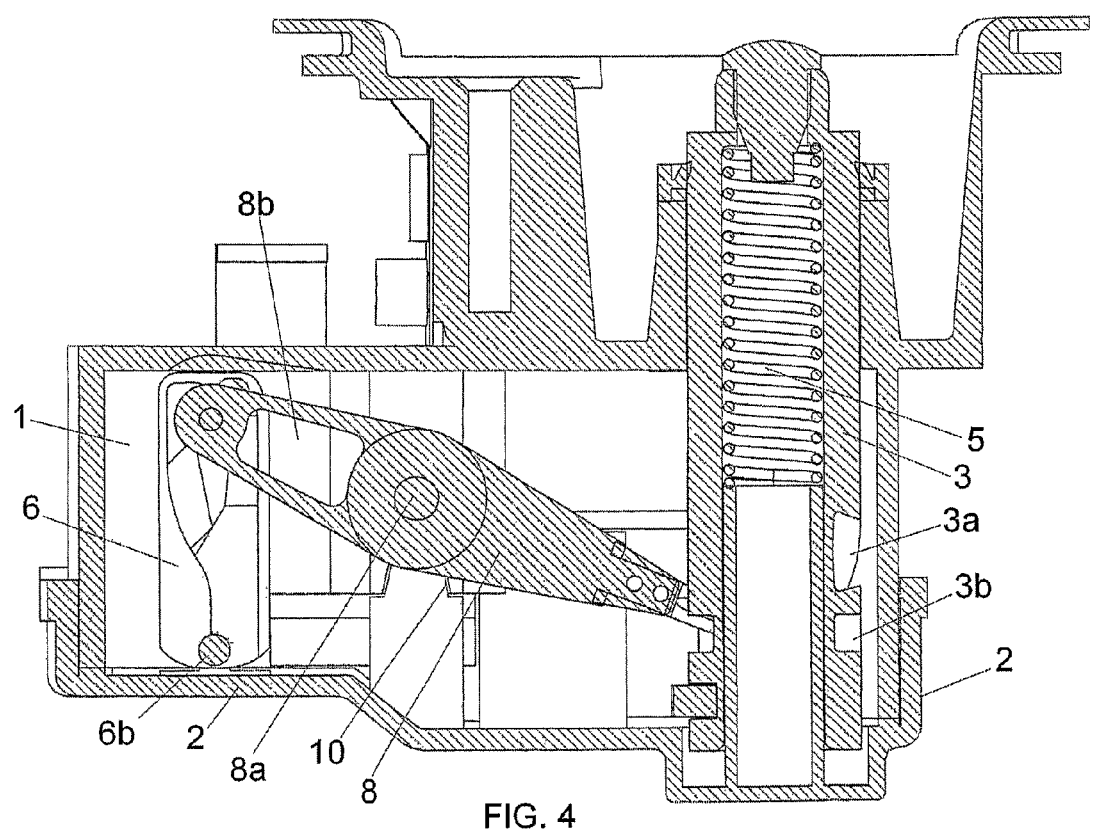
FIG. 4 is a sectional view of the device of the invention with a plane passing through the axis of the said roto-translating pin and orthogonal to the pivoting pin of the said rocker.
Figure 5:
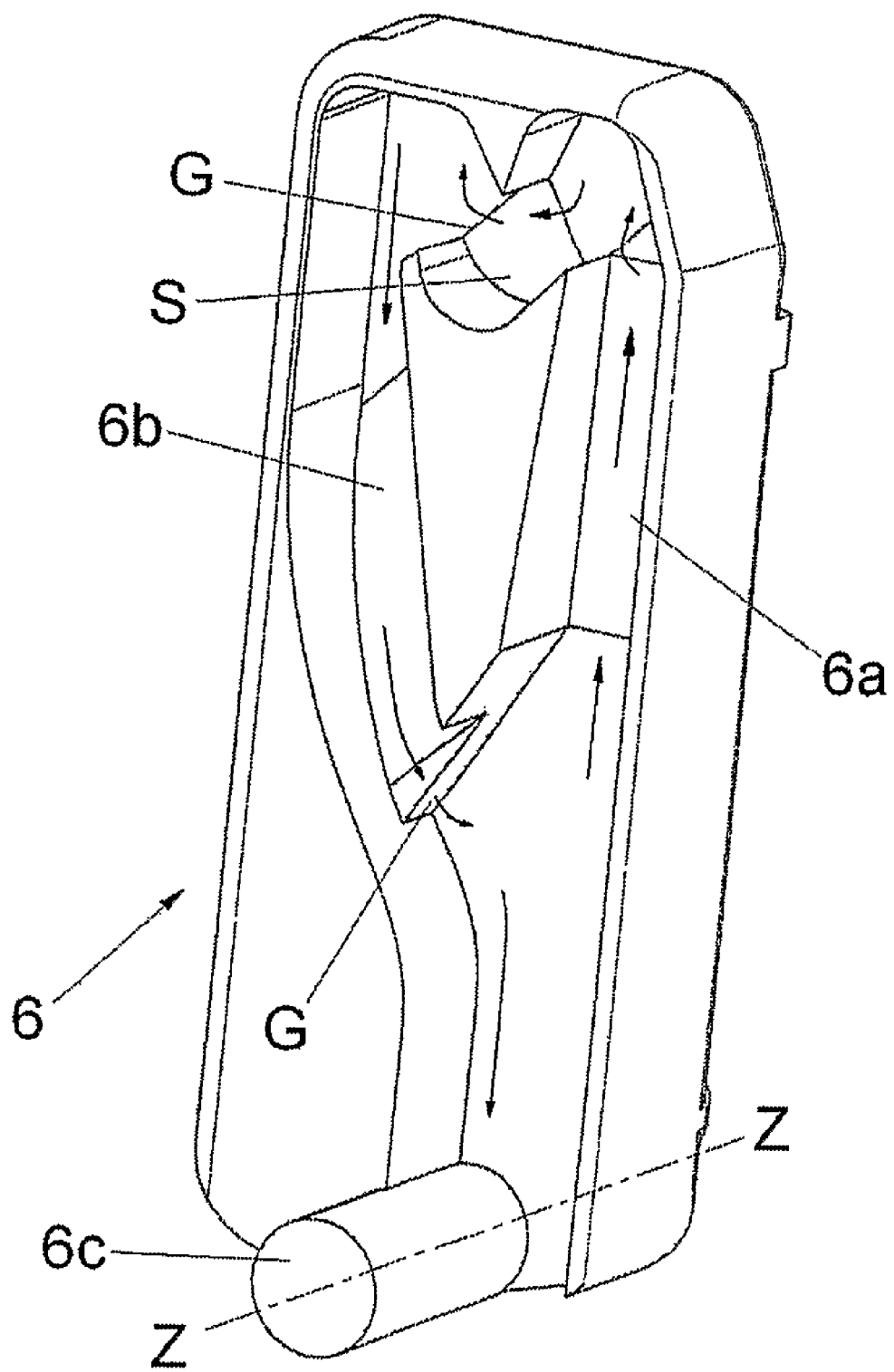
FIG. 5 is an axonometric enlarged view of the heart-shaped cam.

The lock mechanism also including a heart-shaped cam (6), consisting in a plate on which two parallel tracks (6a and 6b) are engraved and connected to form a closed circuit, in which the tappet (7) that must be matched with the said heart-shaped cam (6) slides in the direction as indicated by the arrows in FIG. 5.

With particular reference to FIG. 5, the bottom surface of the first track (6a) has a series of ascending inclined planes that end in a V-shaped housing (S), from which the second track (6b) with a series of descending slides and steps (G) branches, so that the tappet (7) that slides inside the said circuit has a forced direction, due to the fact that it cannot pass over the steps (G) and therefore must descend along the slides and steps (G) of the second track (6b) and then rise along the ascending inclined planes of the first track (6a).

The roto-translating pin (3) has a section of helicoidal thread (3a) where it engages with a peg (1a) obtained in the housing and guiding chamber inside the case (1), while the ejection spring (5) is inserted and hidden inside the same pin (3) with tubular structure.

As mentioned earlier, the present invention is founded on the idea that the heart-shaped cam (6) is positioned in detached parallel position with respect to the roto-translating pin (3), and connected with it by means of a flexible rocker (8) that ends on one side with the tappet (7) interfaced with the heart-shaped cam (6) and on the other side with a semi-arched fork (9) engaged with the roto-translating pin (3), which is specifically provided with a semi-annular groove (3b) where two small pins (9a) are inserted and slide, being obtained inside the fork (9) in diametrically opposite position.

The rocker (8) is centrally provided with a pivoting pin (8a) that is engaged inside a housing (10) obtained inside the case (1), in such a way that the pivoting axis (X) of the rocker (8) is orthogonal to the longitudinal axis (Y) of the roto-translating pin (3) (without intersecting it).

The heart-shaped cam (6) is positioned next to the roto-translating pin (3) on the opposite side with respect to the pivoting pin (8a) of the rocker (8).

The heart-shaped cam (6) is housed inside a specific seat (11) obtained inside the case (1) where the heart-shaped cam (6) is free to make small oscillations to follow the travels of the said tappet (7) along the tracks (6a and 6b) of the heart-shaped cam (6).

In fact, the tappet (7) makes curvilinear travels along a circumference arch with radius equal to the distance between the tappet (7) and the pivoting pin (8a), thus requiring the articulated fixing of the heart-shaped cam (6), which is provided with an opposite pair of pivoting pins (6c) housed inside an opposite pair of seats (12) obtained on the opening of the seat (11).

Naturally, the pivoting axis (Z) of the heart-shaped cam (6) is parallel to the pivoting axis (X) of the rocker (8).

As mentioned earlier, the rocker (8) must be flexible, especially in the section where it supports the tappet (7), in order to permit it to slide against the ascending planes of the first track (6a) and slide along the descending planes and the steps (G) of the second track (6b) of the heart-shaped cam (6).

To that purpose, the rocker (8) is enlightened by a large slot (8b) positioned on the side of the tappet (7), while the other section of the rocker (8) is stiff in order to transmit no transversal stress to the pin (3).

Attention is drawn on the fact that the pin (3) is subjected to a perfectly balanced force system, because the coupling between the pin (3) and the rocker (8) occurs on the two small pins (9a) located on two diametrically opposite symmetrical points with respect to the roto-translation axis (Y).

It appears now evident the reason why the device of the invention is characterised by lower overall dimensions with respect to the existing dimensions with the same inclination angles of the helicoidal thread (3a), or higher inclination angles of the helicoidal thread (3a) with the same overall dimensions. The enclosed figures also illustrate the safety electric lock that prevents the opening of the mechanical lock.

According to a traditional configuration, the said electric lock comprises an electric motor (13) that actuates a sled (14) provided with a projection (15) designed to engage the pin (3), preventing it from roto-translating inside the housing and guiding chamber.

The invention claimed is:

1. An opening and closing device for lids, said device comprising:
   a case adapted to be closed by a lid;
   a roto-translating pin extending outwardly from the case and having a head at an end for engaging the lid;
   an ejection spring contained in and biasing the roto-translating pin;
   a heart-shaped cam positioned parallel to the roto-translating pin and having a closed track that includes at least two grooves parallel and connecting with each other; and
   a rocker rotatable about a center axis thereof between the cam and the roto-translating pin, wherein the rocker includes
   a tappet located at an end of the rocker and slidable along at least the two parallel grooves of the closed track in said heart-shaped cam; and
   a semi-arched fork at another end opposite to said end of the rocker and engaged with the roto-translating pin, wherein the roto-translating pin is rotatable about a rotation axis thereof and the rotation axis of the roto-translating pin is orthogonal to the center axis of the rocker.

2. The opening and closing device for lids, as claimed in claim 1,
wherein the roto-translating pin includes a semi-annular groove, and
wherein the fork includes a pair of pins opposite to each other and are inserted and slidable in the semi-annular groove.

3. The opening and closing device for lids, as claimed in claim 1,
wherein the rocker further comprises a pivoting pin provided on the center axis, and
wherein a pivoting axis defined by the center axis of the rocker is orthogonal to a longitudinal axis of the roto-translating pin.

4. The opening and closing device for lids, as claimed in claim 1, wherein the rocker has a slot positioned on a side of the tappet.

5. The opening and closing device for lids, as claimed in claim 1, wherein the ejection spring is inside the roto-translating pin that has a tubular structure.

6. The opening and closing device for lids, as claimed in claim 1,
wherein the rocker has first and second sections including the tappet and the fork, respectively, and
wherein the first section is more flexible than the second section.

7. The opening and closing device for lids, as claimed in claim 1, wherein the roto-translating pin further comprises a helicoidal thread engageable with a protruding member in the case for allowing a roto-translating movement of the roto-translating pin.

8. The opening and closing device for lids, as claimed in claim 1, wherein the cam includes a pair of pivoting pins opposite to each other and directly connected with seats housed in the case.

9. An opening and closing device for lids, said device comprising:
a case adapted to be closed by a lid;
a roto-translating pin extending outwardly from the case and having a head at an end for engaging the lid, the roto-translating pin comprising an ejection spring biasing the roto-translating pin;
a heart-shaped cam parallel to the roto-translating pin and defining a closed track; and
a rocker rotatable about a center axis thereof between the cam and the roto-translating pin, wherein the rocker comprises:
a tappet at an end of the rocker and slidable along the closed track in said heart-shaped cam; and
a fork at the other end of the rocker and engaged with the roto-translating pin.

10. The opening and closing device for lids, as claimed in claim 1, wherein said at least two grooves are parallel to the rotation axis of the roto-translating pin.

11. The opening and closing device for lids, as claims in claim 1, wherein said roto-translating pin is directly guided by the rocker, which is connected with the cam, to rotate about the rotation axis.

* * * * *